Patented July 6, 1937

2,085,857

UNITED STATES PATENT OFFICE 2,085,857

PRESERVATION OF YEAST

Henry Brougham Hutchinson, Epsom, England, assignor to Standard Brands Incorporated, New York, N. Y.

No Drawing. Application September 26, 1933, Serial No. 691,087. In Great Britain September 29, 1932

9 Claims. (Cl. 99—96)

The present invention relates to the preservation of fresh bakers' yeast and is concerned more especially with the after-treatment of yeast produced by modern methods in which little or no alcohol is present in the fermenting liquid and which is liable on storage to develop blemishes or to become disfigured for example by spots or patches of black, green, yellow or red color due to the growth of numerous species of infecting organisms or fungi.

The chief object of the present invention is to provide a method or process for the after-treatment of yeast produced by modern methods whereby blemishes or disfigurements due to the growth of infecting organisms may be reduced or prevented from forming.

With this object in view fresh bakers' yeast is treated according to the present invention with a dilute aqueous solution of a saturated aliphatic alcohol which has no harmful effect on the yeast but an inhibiting action on infecting organisms such as moulds and bacteria.

Suitable alcohols are ethyl alcohol, propyl and isopropyl alcohol, butyl alcohol, and amyl alcohol; the selected alcohol or alcohols may be used as such or in admixture with one or more denaturants which are not harmful to the yeast, for example, acetic acid.

The quantity of alcohol used depends to some extent upon the particular one selected and upon the method of treatment used but generally speaking it is conceived that an amount of from 0.05% to 4% of the weight of pressed yeast treated should give satisfactory results.

The yeast may be subjected to the action of the alcohol in any convenient manner; for example, it has been found that the addition of dilute ethyl alcohol of 2 per cent. or less strength to the separated, washed and pressed yeast cake effectively prevents the growth of objectionable infecting organisms contained therein. Alternatively it has been found that a similar result may be obtained by allowing the pressed yeast to stand in a dilute solution of alcohol of 1.0% concentration or less for a period of about one hour, or the yeast cream may be treated with the alcoholic solution before pressing.

The following examples illustrate the manner in which the invention can be carried into effect:—

*Example I*

Pressed yeast as ordinarily produced by modern methods was mixed with a 2% aqueous solution of ethyl alcohol in an amount equivalent to from 12 to 14 per cent. of the weight of the pressed yeast in place of the plain water habitually used to bring the pressed yeast to normal commercial consistency i. e., containing about 73% water. After 7 days' storage in a warm room the yeast showed no signs of superficial growth of those fungal or bacterial forms producing colored spots and blemishes in the yeast cake. A portion of the same yeast treated with the same amount of plain water and stored under the same conditions, showed extensive growth of chromogenic organisms.

*Example II*

A portion of yeast separated, washed and pressed in the ordinary manner was immersed in an aqueous solution containing 0.56% of ethyl alcohol and 0.14% butyl alcohol for 1 hour and then separated from the solution. The yeast so treated remained perfectly free from colored spots and blemishes after 7 days' storage in a warm room. A portion of the same yeast without treatment, under the same conditions of storage, showed an extensive growth of chromogenic organisms.

What I claim is:—

1. The method for the preservation of fresh bakers' yeast, which comprises permanently incorporating into the yeast an aqueous solution of a saturated aliphatic alcohol belonging to the group consisting of ethyl, propyl, iso-propyl, butyl and amyl which has no harmful effect on the yeast but an inhibiting action upon infecting molds and bacteria which give rise to black, green, yellow and red color patches.

2. The method for the preservation of fresh bakers' yeast, which comprises permanently incorporating into the yeast an aqueous solution of a saturated aliphatic alcohol belonging to the group consisting of ethyl, propyl, iso-propyl, butyl and amyl having a concentration upwards to 2%.

3. The method for the preservation of fresh bakers' yeast, which comprises permanently incorporating into yeast an aqueous solution of a saturated aliphatic alcohol belonging to the group consisting of ethyl, propyl, iso-propyl, butyl and amyl in an amount which represents incorporation of alcohol to the extent of 0.05% to 4% of the weight of the yeast.

4. The method for the preservation of fresh bakers' yeast, which comprises permanently incorporating into the yeast an aqueous solution of ethyl alcohol in an amount to represent incorporation of the alcohol to the extent of from 0.05% to 4% of the weight of the yeast.

5. The method for the preservation of fresh bakers' yeast, which comprises permanently incorporating into the yeast an aqueous solution of propyl alcohol in an amount to represent incorporation of the alcohol to the extent of from 0.05% to 4% of the weight of the yeast.

6. The method for the preservation of fresh bakers' yeast, which comprises permanently incorporating into the yeast an aqueous solution of butyl alcohol in an amount to represent incorporation of the alcohol to the extent of from 0.05% to 4% of the weight of the yeast.

7. The method for the treatment of fresh bakers' yeast, which comprises restoring pressed yeast to its normal commercial consistency i. e., containing about 73% water and preserving said yeast against infecting molds and bacteria by mixing yeast in compressed condition with an aqueous solution of a saturated aliphatic alcohol belonging to the group consisting of ethyl, propyl, iso-propyl, butyl and amyl having a concentration upwards to 2% whereby said alcohol is permanently incorporated into the yeast.

8. The method for the treatment of fresh bakers' yeast, which comprises restoring pressed yeast to its normal commercial consistency i. e., containing about 73% water and preserving said yeast against infecting molds and bacteria by mixing yeast in compressed condition with an aqueous solution of ethyl alcohol having a concentration upwards to 2% whereby said alcohol is permanently incorporated into the yeast, the amount of said alcohol being such that it represents the incorporation thereof to the extent of from 0.05% to 4% of the weight of the yeast.

9. The method for the preservation of fresh bakers' yeast, which comprises permanently incorporating into yeast an aqueous solution of a saturated aliphatic alcohol belonging to the group consisting of ethyl, propyl, iso-propyl, butyl and amyl, containing acetic acid, in an amount which represents incorporation of alcohol to the extent of 0.05% to 4% of the weight of the yeast.

HENRY BROUGHAM HUTCHINSON.